United States Patent
Kurokawa et al.

(10) Patent No.: US 11,628,753 B2
(45) Date of Patent: Apr. 18, 2023

(54) SEAT FRAME

(71) Applicant: TOYOTA BOSHOKU KABUSHIKI KAISHA, Aichi-ken (JP)

(72) Inventors: Kimiyasu Kurokawa, Gifu-ken (JP); Yoshiyuki Kumazaki, Aichi-ken (JP); Keigo Matsumoto, Aichi-ken (JP)

(73) Assignee: TOYOTA BOSHOKU KABUSHIKI KAISHA, Aichi-ken (JP)

( * ) Notice: Subject to any disclaimer, the term of this patent is extended or adjusted under 35 U.S.C. 154(b) by 0 days.

(21) Appl. No.: 17/563,709

(22) Filed: Dec. 28, 2021

(65) Prior Publication Data

US 2022/0212580 A1 Jul. 7, 2022

(30) Foreign Application Priority Data

Jan. 7, 2021 (JP) .............................. JP2021-001381

(51) Int. Cl.
*B60N 2/68* (2006.01)
*B60N 2/20* (2006.01)

(52) U.S. Cl.
CPC ............... *B60N 2/682* (2013.01); *B60N 2/20* (2013.01)

(58) Field of Classification Search
CPC ...................................................... A47C 7/682
See application file for complete search history.

(56) References Cited

U.S. PATENT DOCUMENTS

| 10,442,319 B2 * | 10/2019 | Kimura ..................... B60N 2/68 |
| 11,142,107 B2 * | 10/2021 | Yamaguchi ............ B60N 2/682 |
| 2017/0313224 A1 * | 11/2017 | Akaike ..................... B60N 2/68 |
| 2019/0359103 A1 * | 11/2019 | Inoue ........................ B60N 2/68 |
| 2020/0276921 A1 * | 9/2020 | Yamaguchi ........... B60N 2/4221 |

FOREIGN PATENT DOCUMENTS

| CN | 112172629 A | * | 1/2021 | ............... B60N 2/20 |
| CN | 114043911 A | * | 2/2022 | |
| JP | 2017-19473 A | | 1/2017 | |

\* cited by examiner

*Primary Examiner* — Timothy J Brindley
(74) *Attorney, Agent, or Firm* — Greenblum & Bernstein, P.L.C.

(57) ABSTRACT

A seat frame includes a cushion frame, a back frame, a recliner plate, a bracket arranged to be in contact with a side surface of each cushion side frame, a nut, an end nut, a bolt, and an end bolt. The bracket includes a nut fixing portion and a pipe fixing portion. The bolt is fixed to the nut in a state of being inserted through a bolt hole and a bolt insertion hole. The end bolt is fixed to the end nut in a state of being inserted through an end bolt hole.

4 Claims, 5 Drawing Sheets

SEAT FRAME

This nonprovisional application is based on Japanese Patent Application No. 2021-001381 filed on Jan. 7, 2021 with the Japan Patent Office, the entire contents of which are hereby incorporated by reference.

BACKGROUND OF THE INVENTION

Field of the Invention

The present disclosure relates to a seat frame.

Description of the Background Art

Conventionally, a seat frame including a cushion frame and a back frame has been known, as described in Japanese Patent Laying-Open No. 2017-19473 or the like. The cushion frame in this seat frame includes a pair of right and left side frames and a rear pipe connecting rear portions of the side frames. A weld nut is welded to a portion above the rear pipe, of an inner side surface of each side frame. The back frame includes a pair of right and left side frames. A recliner and a recliner plate are attached to a lower end of each side frame. The recliner plate is fixed to the side frame of the cushion frame using the weld nut and a bolt.

SUMMARY OF THE INVENTION

In the seat frame described in Japanese Patent Laying-Open No. 2017-19473, a large load is transferred from the side frame of the back frame to the side frame of the cushion frame via a seat belt at the time of forward collision of a vehicle or the like. Accordingly, the rear portion in the side frame of the cushion frame has a large shape to ensure structural strength.

An object of the present disclosure is to provide a seat frame which can avoid an increase in the size of a rear portion of a cushion side frame.

A seat frame according to one aspect of the present disclosure includes: a cushion frame constituting a framework of a seat cushion, the cushion frame including a pair of cushion side frames and a rear pipe connecting rear portions of the pair of cushion side frames; a back frame constituting a framework of a back seat cushion, the back frame including a pair of back side frames; a recliner plate fixed to a lower end of each back side frame; a bracket arranged to be in contact with a side surface of each cushion side frame; a nut fixed to the bracket; an end nut fixed to an end of the rear pipe; a bolt which can be screwed into the nut; and an end bolt which can be screwed into the end nut, the rear portion of each cushion side frame being provided with a bolt insertion hole through which the bolt is inserted and a pipe insertion hole through which the rear pipe is inserted, the recliner plate being provided with a bolt hole through which the bolt is inserted and an end bolt hole through which the end bolt is inserted, the bracket including a nut fixing portion to which the nut is fixed and a pipe fixing portion for fixing the rear pipe with the rear pipe being inserted therethrough, the bolt being fixed to the nut in a state of being inserted through the bolt hole and the bolt insertion hole, the end bolt being fixed to the end nut in a state of being inserted through the end bolt hole.

EFFECTS OF INVENTION

According to the present disclosure, a seat frame which can avoid an increase in the size of a rear portion of a cushion side frame can be provided.

DESCRIPTION OF THE PREFERRED EMBODIMENTS

Figure 1:
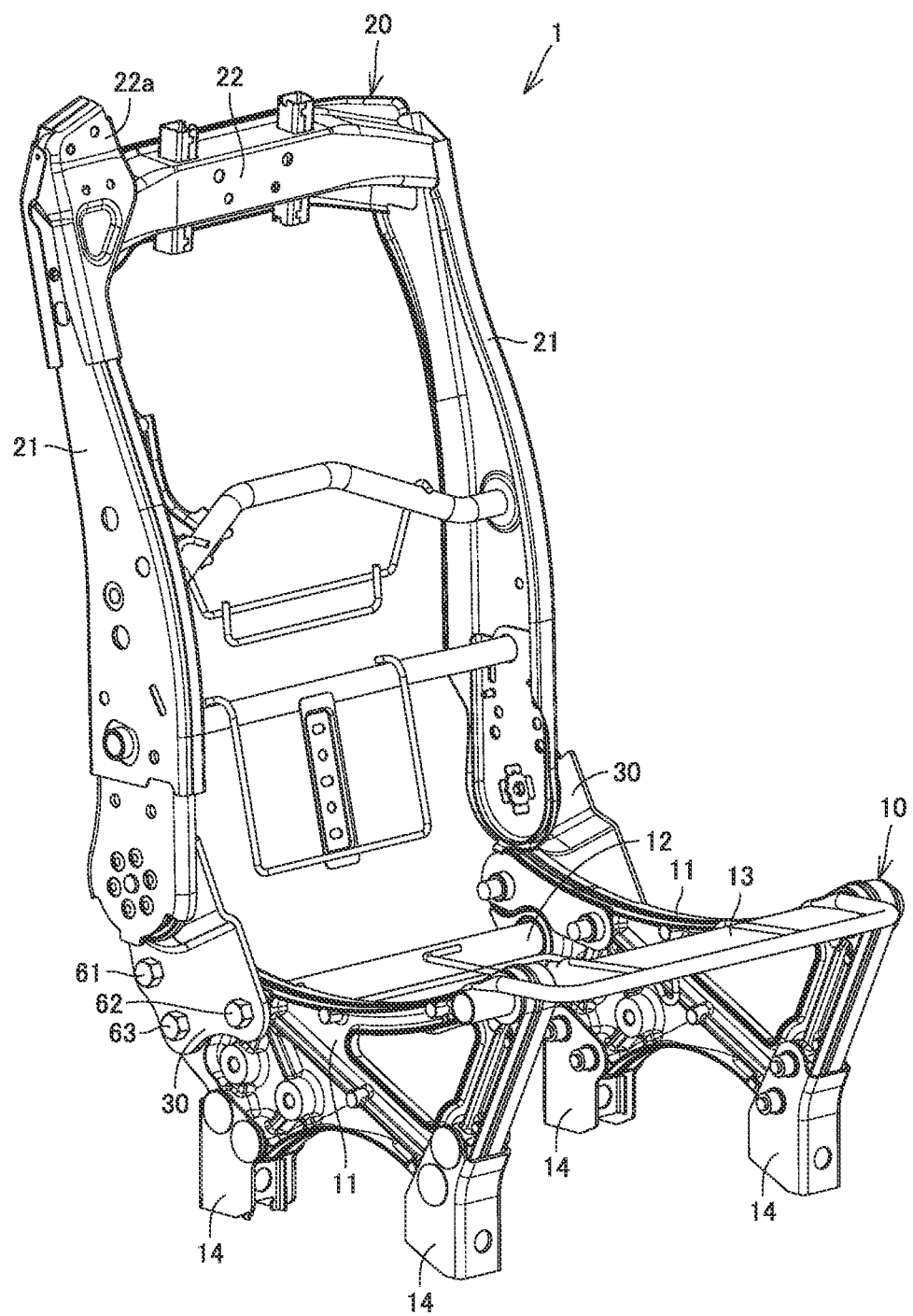
FIG. 1 is a perspective view schematically showing a seat frame in one embodiment of the present disclosure.
Figure 2:
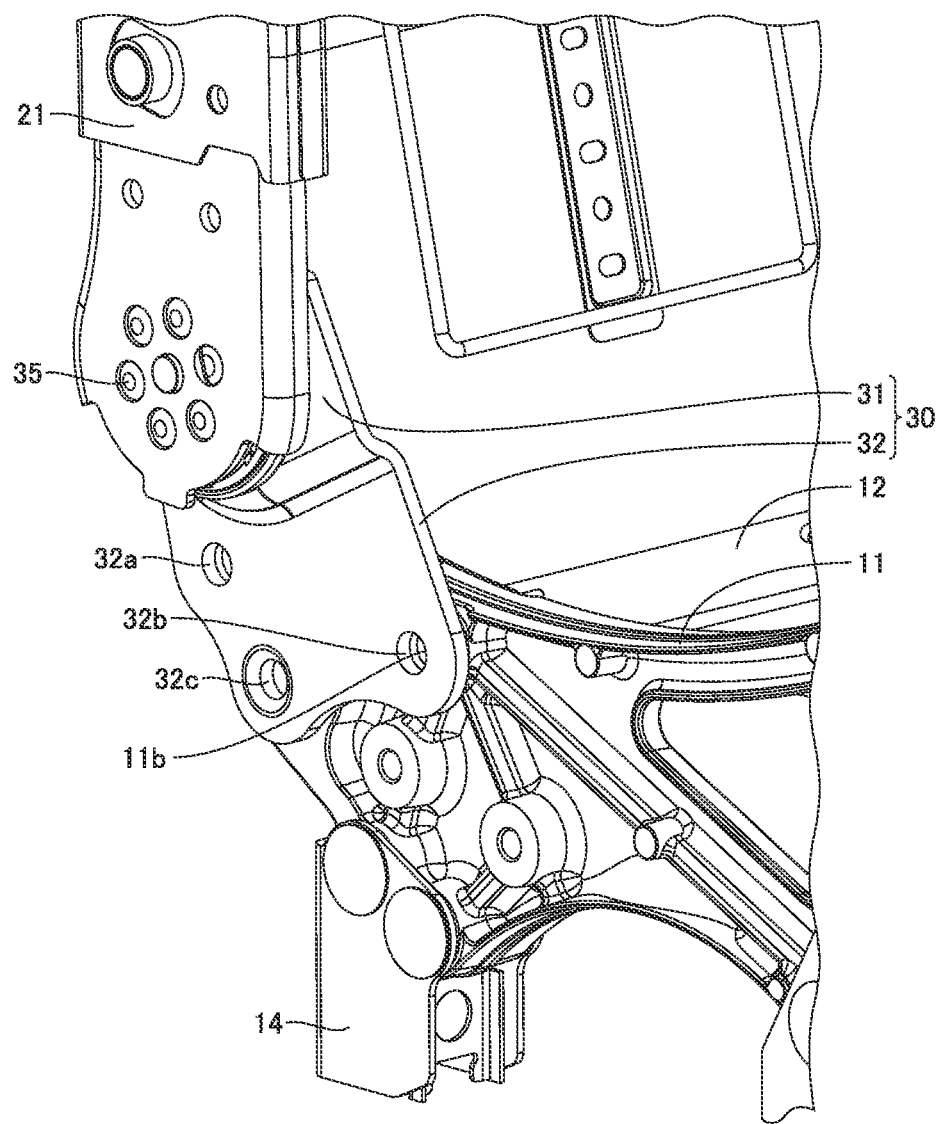
FIG. 2 is a perspective view showing the vicinity of an outer side surface of a recliner plate.
Figure 3:
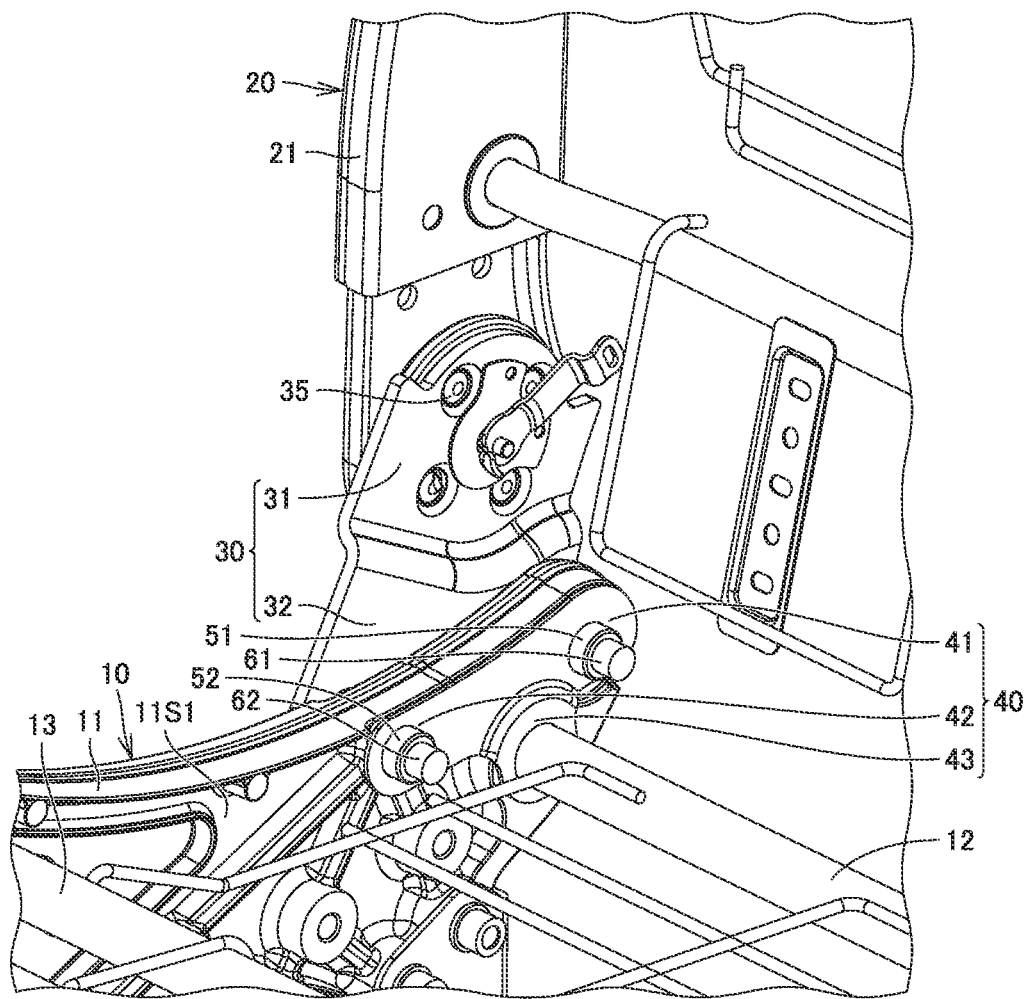
FIG. 3 is a perspective view showing the vicinity of an inner side surface of the recliner plate.
Figure 4:
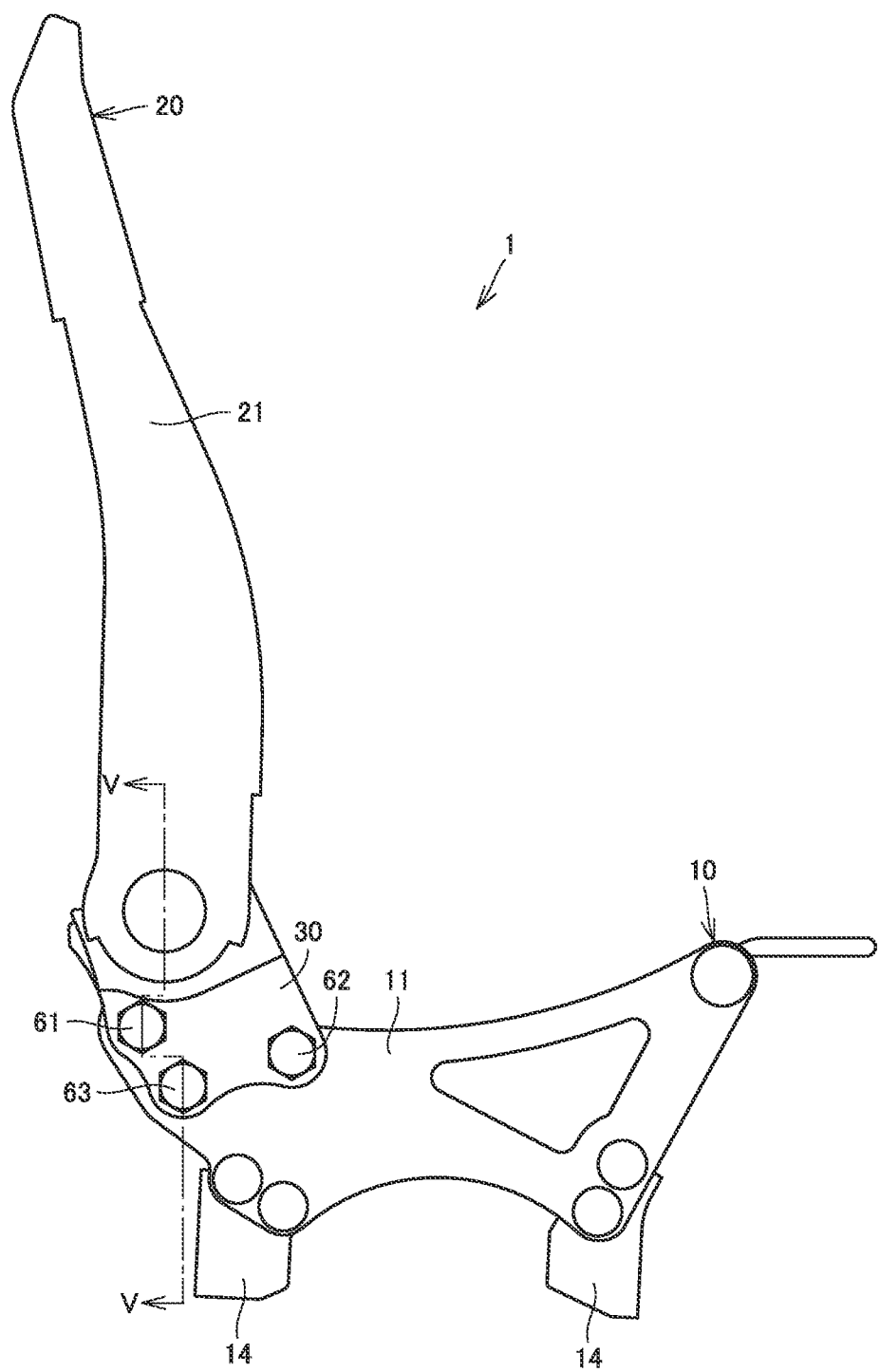
FIG. 4 is a side view of the seat frame.

An embodiment of the present disclosure will be described with reference to the drawings. It should be noted that, in the drawings referred to below, identical or corresponding members will be designated by the same reference numerals.

FIG. 1 is a perspective view schematically showing a seat frame in one embodiment of the present disclosure. As shown in FIG. 1, a seat frame 1 in the present embodiment includes a cushion frame 10, a back frame 20, recliner plates 30, brackets 40, a plurality of nuts 51 to 53, and a plurality of bolts 61 to 63. Seat frame 1 functions as a frame of a seat for a conveyance, especially a seat for a vehicle.

Cushion frame 10 constitutes a framework of a seat cushion (not shown). Cushion frame 10 includes a pair of cushion side frames 11, a rear pipe 12, a front pipe 13, and legs 14.

The pair of cushion side frames 11 are arranged at positions spaced from each other in a width direction of the vehicle. Each cushion side frame 11 has a shape extending in a front/rear direction of the vehicle. Each cushion side frame 11 is made of a light metal (aluminum, magnesium, or the like) or a resin having a specific gravity smaller than that of iron. In the present embodiment, each cushion side frame 11 is made of aluminum. Legs 14 are connected to lower ends of cushion side frames 11.

Each cushion side frame 11 is provided with a first bolt insertion hole 11a corresponding to a bolt insertion hole, a second bolt insertion hole 11b corresponding to another bolt insertion hole, and a pipe insertion hole 11c. First bolt insertion hole 11a and second bolt insertion hole 11b are each constituted by a through hole through which a bolt is inserted. Pipe insertion hole 11c is constituted by a through hole through which rear pipe 12 is inserted. First bolt insertion hole 11a is formed behind pipe insertion hole 11c. Second bolt insertion hole 11b is formed in front of pipe insertion hole 11c.

Rear pipe 12 connects rear portions of the pair of cushion side frames 11. Rear pipe 12 is made of iron. In the present embodiment, rear pipe 12 is formed in a cylindrical shape.

Front pipe 13 connects front portions of the pair of cushion side frames 11. Front pipe 13 is made of iron. In the present embodiment, front pipe 13 is formed in a cylindrical shape.

Back frame 20 constitutes a framework of a back seat cushion (not shown). Back frame 20 can be tilted with respect to cushion frame 10. Back frame 20 is made of iron. Back frame 20 includes a pair of back side frames 21 and an upper frame 22.

The pair of back side frames 21 are arranged at positions spaced from each other in the width direction of the vehicle. Each back side frame 21 has a shape extending in an up/down direction.

Upper frame 22 connects upper ends of back side frames 21. An outer end of upper frame 22 in the width direction is provided with a belt insertion portion 22a through which a seat belt is inserted.

Recliner plate 30 is fixed to a lower end of each back side frame 21. Recliner plate 30 is made of iron. Recliner plate 30 includes an upper connection portion 31 and a lower connection portion 32.

Upper connection portion 31 is a portion fixed to back side frame 21. A recliner 35 which allows tilting of back side frame 21 with respect to recliner plate 30 is attached between upper connection portion 31 and back side frame 21.

Lower connection portion 32 is a portion fixed to cushion side frame 11. Lower connection portion 32 is fixed to an outer side surface of cushion side frame 11. Lower connection portion 32 has a shape extending downward from upper connection portion 31.

Figure 5:
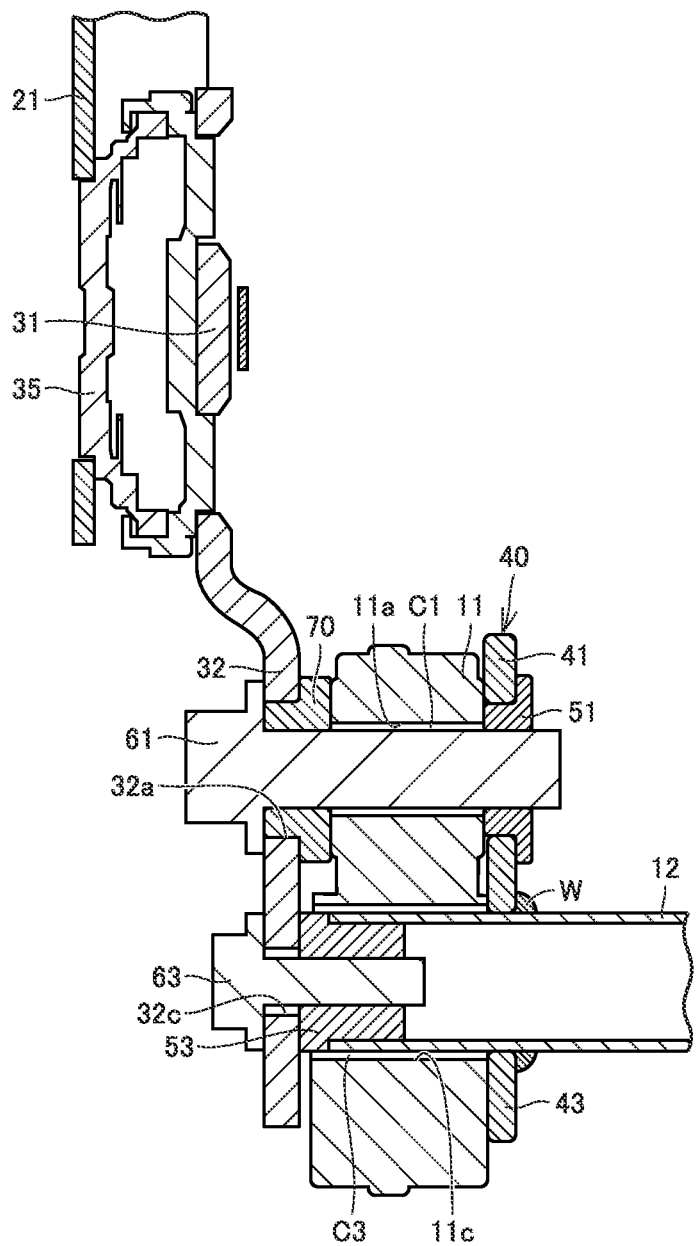
FIG. 5 is a cross sectional view taken along a line V-V in FIG. 4.

Lower connection portion 32 is provided with a first bolt hole 32a corresponding to a bolt hole, a second bolt hole 32b corresponding to another bolt hole, and an end bolt hole 32c. A bolt is inserted through each of bolt holes 32a to 32c. First bolt hole 32a is formed behind end bolt hole 32c. Second bolt hole 32b is formed in front of end bolt hole 32c. As shown in FIG. 5, a spacer 70 may be arranged between first bolt hole 32a and cushion side frame 11.

In the present embodiment, the plurality of nuts include a first nut 51 corresponding to a nut, a second nut 52 corresponding to another nut, and an end nut 53. First nut 51 and second nut 52 are fixed to bracket 40. End nut 53 is fixed to an end of rear pipe 12 by welding or the like.

Bracket 40 is arranged to be in contact with a side surface of cushion side frame 11. More specifically, bracket 40 is arranged to be in contact with an inner side surface 11S1 of cushion side frame 11. Bracket 40 is made of iron. Bracket 40 includes a first nut fixing portion 41 corresponding to a nut fixing portion, a second nut fixing portion 42 corresponding to another nut fixing portion, and a pipe fixing portion 43.

First nut fixing portion 41 is a portion to which first nut 51 is fixed. Specifically, first nut 51 is welded to first nut fixing portion 41. First nut fixing portion 41 is arranged behind rear pipe 12.

Second nut fixing portion 42 is a portion to which second nut 52 is fixed. Specifically, second nut 52 is welded to second nut fixing portion 42. Second nut fixing portion 42 is provided in front of rear pipe 12.

Pipe fixing portion 43 fixes rear pipe 12 with rear pipe 12 being inserted therethrough. Specifically, rear pipe 12 is welded to pipe fixing portion 43. As shown in FIG. 5, a welded portion W is formed at a boundary between rear pipe 12 and pipe fixing portion 43. Pipe fixing portion 43 is provided between first nut fixing portion 41 and second nut fixing portion 42. A clearance C3 may be provided between rear pipe 12 and pipe insertion hole 11c.

The plurality of bolts include a first bolt 61 corresponding to a bolt, a second bolt 62 corresponding to another bolt, and an end bolt 63.

First bolt 61 is fixed to first nut 51 in a state of being inserted through first bolt hole 32a of recliner plate 30 and first bolt insertion hole 11a of cushion side frame 11. As shown in FIG. 5, a clearance C1 is provided between first bolt 61 and first bolt insertion hole 11a.

Second bolt 62 is fixed to second nut 52 in a state of being inserted through second bolt hole 32b of recliner plate 30 and second bolt insertion hole 11b of cushion side frame 11. A clearance is provided between second bolt 62 and second bolt insertion hole 11b.

End bolt 63 is fixed to end nut 53 in a state of being inserted through end bolt hole 32c of recliner plate 30.

As described above, in seat frame 1, recliner plate 30 is fixed to bracket 40 via first bolt 61 and first nut 51, and is also fixed to rear pipe 12 and bracket 40 via end bolt 63 and end nut 53. That is, seat frame 1 has two paths for transferring a load from back side frame 21 to bracket 40 and rear pipe 12. Accordingly, the load inputted to back side frame 21 via the seat belt at the time of forward collision of the vehicle or the like is received at bracket 40 and rear pipe 12 through the two paths described above. Therefore, an increase in the size of the rear portion of cushion side frame 11 can be avoided.

It is understood by a person skilled in the art that the exemplary embodiment described above is a specific example of the following aspects.

A seat frame in the embodiment described above includes: a cushion frame constituting a framework of a seat cushion, the cushion frame including a pair of cushion side frames and a rear pipe connecting rear portions of the pair of cushion side frames; a back frame constituting a framework of a back seat cushion, the back frame including a pair of back side frames; a recliner plate fixed to a lower end of each back side frame; a bracket arranged to be in contact with a side surface of each cushion side frame; a nut fixed to the bracket; an end nut fixed to an end of the rear pipe; a bolt which can be screwed into the nut; and an end bolt which can be screwed into the end nut, the rear portion of each cushion side frame being provided with a bolt insertion hole through which the bolt is inserted and a pipe insertion hole through which the rear pipe is inserted, the recliner plate being provided with a bolt hole through which the bolt is inserted and an end bolt hole through which the end bolt is inserted, the bracket including a nut fixing portion to which the nut is fixed and a pipe fixing portion for fixing the rear pipe with the rear pipe being inserted therethrough, the bolt being fixed to the nut in a state of being inserted through the bolt hole and the bolt insertion hole, the end bolt being fixed to the end nut in a state of being inserted through the end bolt hole.

In the seat frame, the recliner plate is fixed to the bracket via the bolt and the nut, and is also fixed to the rear pipe and the bracket via the end bolt and the end nut. That is, the seat frame has two paths for transferring a load from the back side frame to the bracket and the rear pipe. Accordingly, the load inputted to the back side frame via the seat belt at the time of forward collision of the vehicle or the like is received at the bracket and the rear pipe through the two paths described above. Therefore, an increase in the size of the rear portion of the cushion side frame can be avoided.

In addition, preferably, the pair of back side frames, the recliner plate, the bracket, and the rear pipe are made of iron, and the pair of cushion side frames are made of a light metal or a resin having a specific gravity smaller than that of iron.

With this structure, it is possible to reduce the weight of the seat frame and also avoid the increase in the size of the rear portion of the cushion side frame.

In addition, preferably, a clearance is formed between the bolt and the bolt insertion hole.

In this aspect, transfer of the load from the bolt to the cushion side frame is suppressed, and thus the increase in the size of the rear portion of the cushion side frame is avoided more reliably.

In addition, preferably, the seat frame further includes: another nut fixed to the bracket; and another bolt which can be screwed into the other nut, wherein the rear portion of each cushion side frame is further provided with another bolt insertion hole through which the other bolt is inserted, the recliner plate is further provided with another bolt hole through which the other bolt is inserted, the bracket further includes another nut fixing portion to which the other nut is fixed, the other bolt is fixed to the other nut in a state of being inserted through the other bolt hole and the other bolt insertion hole, the nut, the bolt insertion hole, the bolt hole, and the bolt are arranged behind the rear pipe, and the other nut, the other bolt insertion hole, the other bolt hole, and the other bolt are arranged in front of the rear pipe.

In this aspect, there are three paths for transferring the load from the back side frame to the bracket and the rear pipe, and thus the increase in the size of the rear portion of the cushion side frame is avoided more reliably.

It should be understood that the embodiment disclosed herein is illustrative and non-restrictive in every respect. The scope of the present invention is defined by the scope of the claims, rather than the description of the embodiment described above, and is intended to include any modifications within the scope and meaning equivalent to the scope of the claims.

What is claimed is:

1. A seat frame comprising:
   a cushion frame constituting a framework of a seat cushion, the cushion frame including a pair of cushion side frames and a rear pipe connecting rear portions of the pair of cushion side frames;
   a back frame constituting a framework of a back seat cushion, the back frame including a pair of back side frames;
   a recliner plate fixed to a lower end of each back side frame;
   a bracket arranged to be in contact with a side surface of each cushion side frame;
   a nut fixed to the bracket;
   an end nut fixed to an end of the rear pipe;
   a bolt which can be screwed into the nut; and
   an end bolt which can be screwed into the end nut,
   the rear portion of each cushion side frame being provided with a bolt insertion hole through which the bolt is inserted and a pipe insertion hole through which the rear pipe is inserted,
   the recliner plate being provided with a bolt hole through which the bolt is inserted and an end bolt hole through which the end bolt is inserted,
   the bracket including
      a nut fixing portion to which the nut is fixed, and
      a pipe fixing portion for fixing the rear pipe with the rear pipe being inserted therethrough,
   the bolt being fixed to the nut in a state of being inserted through the bolt hole and the bolt insertion hole,
   the end bolt being fixed to the end nut in a state of being inserted through the end bolt hole.

2. The seat frame according to claim 1, wherein
   the pair of back side frames, the recliner plate, the bracket, and the rear pipe are made of iron, and
   the pair of cushion side frames are made of a light metal or a resin having a specific gravity smaller than that of iron.

3. The seat frame according to claim 1, wherein a clearance is formed between the bolt and the bolt insertion hole.

4. The seat frame according to claim 1, further comprising:
   another nut fixed to the bracket; and
   another bolt which can be screwed into the other nut, wherein
   the rear portion of each cushion side frame is further provided with another bolt insertion hole through which the other bolt is inserted,
   the recliner plate is further provided with another bolt hole through which the other bolt is inserted,
   the bracket further includes another nut fixing portion to which the other nut is fixed,
   the other bolt is fixed to the other nut in a state of being inserted through the other bolt hole and the other bolt insertion hole,
   the nut, the bolt insertion hole, the bolt hole, and the bolt are arranged behind the rear pipe, and
   the other nut, the other bolt insertion hole, the other bolt hole, and the other bolt are arranged in front of the rear pipe.

* * * * *